(12) United States Patent
Habing et al.

(10) Patent No.: US 7,326,059 B2
(45) Date of Patent: Feb. 5, 2008

(54) CHILD REWARD CENTER

(75) Inventors: Theodore G. Habing, Tustin, CA (US); Douglas J. Habing, Long Beach, CA (US)

(73) Assignee: Dream Visions, LLC, Tustin, CA (US)

( * ) Notice: Subject to any disclaimer, the term of this patent is extended or adjusted under 35 U.S.C. 154(b) by 128 days.

(21) Appl. No.: 11/332,551

(22) Filed: Jan. 12, 2006

(65) Prior Publication Data
US 2007/0160965 A1    Jul. 12, 2007

(51) Int. Cl.
*G09B 19/00*    (2006.01)
(52) U.S. Cl. .................................................... 434/236
(58) Field of Classification Search ................. 434/236; 273/118 R, 118 D, 121 A, 121 B, 121 R
See application file for complete search history.

(56) References Cited

U.S. PATENT DOCUMENTS

| | | | |
|---|---|---|---|
| 1,615,342 A | | 1/1927 | Nelson |
| 2,003,349 A | * | 6/1935 | Dumble ...................... 194/210 |
| 2,522,133 A | | 9/1950 | Sanders |
| 3,476,391 A | * | 11/1969 | Fejko ...................... 273/124 R |
| 3,934,881 A | * | 1/1976 | Goldfarb et al. ............ 273/110 |
| 4,032,148 A | | 6/1977 | Sanders |
| 4,342,384 A | | 8/1982 | Fukase et al. |
| 4,840,375 A | | 6/1989 | Lawlor et al. |
| 4,844,447 A | | 7/1989 | McKnight |
| 4,848,748 A | | 7/1989 | Krutsch |
| 5,099,232 A | | 3/1992 | Howes |
| 5,149,093 A | * | 9/1992 | Schilling et al. ......... 273/118 A |
| 5,288,233 A | * | 2/1994 | Green ........................ 434/238 |
| 5,429,373 A | * | 7/1995 | Chelko et al. .............. 273/440 |
| 5,439,103 A | | 8/1995 | Howes |
| 5,573,407 A | * | 11/1996 | Dunford ..................... 434/262 |
| D388,122 S | * | 12/1997 | Beene ......................... D20/7 |
| 5,735,379 A | | 4/1998 | Schulze et al. |
| 5,735,724 A | | 4/1998 | Udagawa |
| 5,954,512 A | * | 9/1999 | Fruge ........................ 434/238 |
| 5,988,637 A | * | 11/1999 | Dickerson ............... 273/118 R |
| 6,010,130 A | * | 1/2000 | Schreiber ................ 273/121 B |
| 6,062,560 A | * | 5/2000 | Peterson ................ 273/118 R |
| 6,170,662 B1 | | 1/2001 | Howes |
| 6,209,868 B1 | * | 4/2001 | Norton .................. 273/118 R |
| 6,257,573 B1 | | 7/2001 | Munoz et al. |
| 6,273,027 B1 | * | 8/2001 | Watson et al. ............. 119/712 |
| 6,497,407 B2 | * | 12/2002 | Humphrey .............. 273/118 R |
| 2001/0034013 A1 | * | 10/2001 | Bennett ...................... 434/238 |
| 2006/0172268 A1 | * | 8/2006 | Thurman .................... 434/236 |

OTHER PUBLICATIONS

"Treasure Tower", 2003 [retrieved online May 2, 2007].*

* cited by examiner

*Primary Examiner*—Kurt Fernstrom
(74) *Attorney, Agent, or Firm*—Blakely, Sokoloff, Taylor & Zafman, LLP

(57) ABSTRACT

A motivational apparatus contains a supply of tokens. The apparatus includes a release mechanism for releasing one of the tokens, which may be actuated by a child as a reward for good behavior. After being released, the token is collected in a reservoir. The apparatus may include a token routing path with a variety of obstacles and the like for the amusement of the child. Once a predetermined number of tokens have been collected in the reservoir, the child may be awarded a prize. The prize may be dispensed by the apparatus in response to the collection of the predetermined number of tokens.

16 Claims, 2 Drawing Sheets

CHILD REWARD CENTER

BACKGROUND OF THE INVENTION

1. Field of the Invention

The present invention relates generally to the field of amusement devices and, more particularly, to a device for rewarding a child for good behavior.

2. Background

Motivating a child to exhibit good behavior is a challenge faced by every parent. Parents often resort to punishment for bad behavior as a means for motivating good behavior. However, child development specialists generally agree that negative rewards for bad behavior are not as effective as positive rewards for good behavior.

The present invention provides a means for motivating a child to exhibit good behavior and to reward the child for consistent good behavior.

SUMMARY OF THE INVENTION

In an exemplary embodiment, the present invention comprises a motivational apparatus having a supply of tokens. The apparatus includes a release mechanism for releasing one of the tokens, which may be actuated by a child as a reward for good behavior. After being released, the token is collected in a reservoir. The apparatus may include a token routing path with a variety of obstacles and the like for the amusement of the child. Once a predetermined number of tokens have been collected in the reservoir, the child may be awarded a prize. The prize may be dispensed by the apparatus in response to the collection of the predetermined number of tokens.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
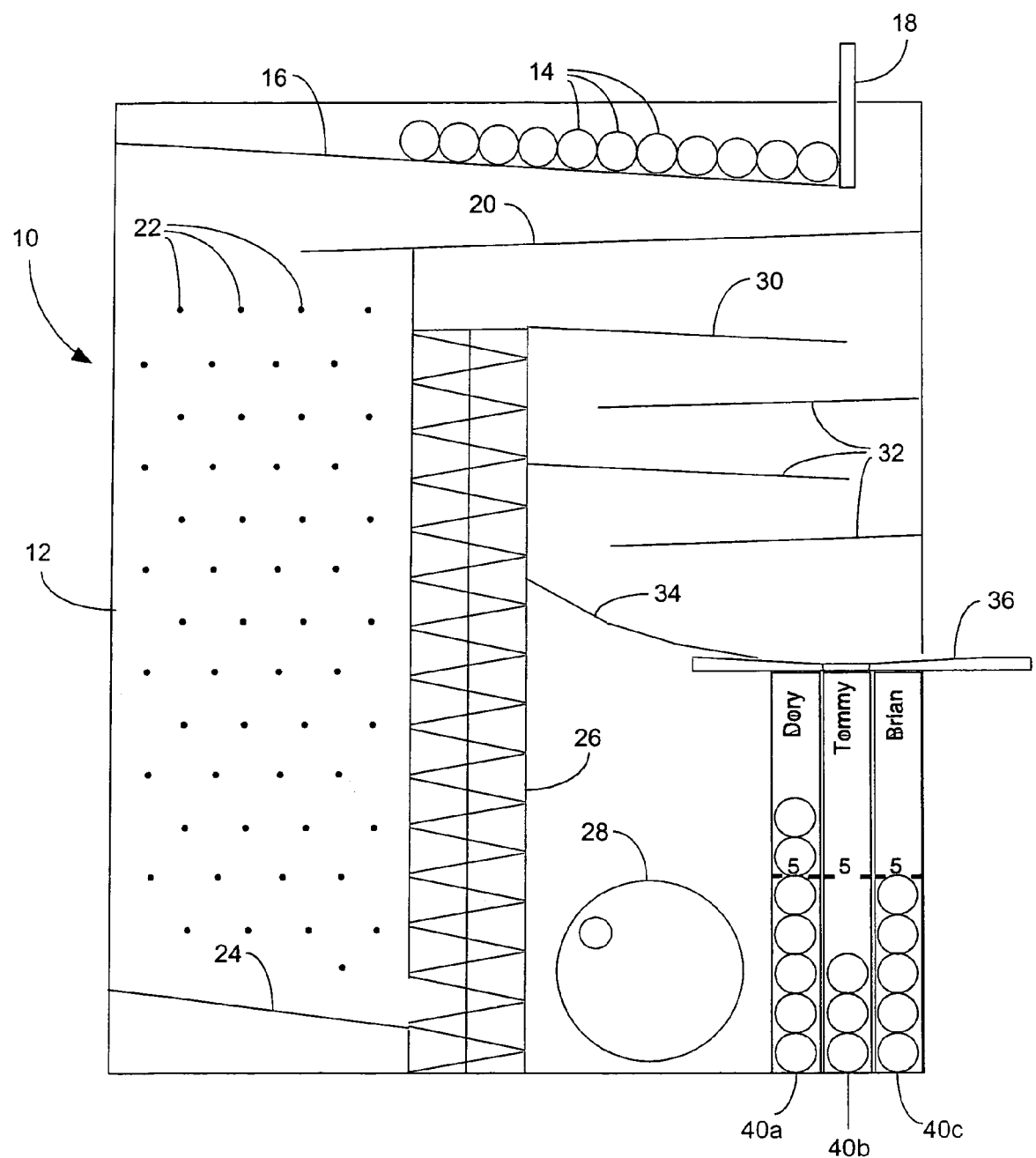
FIG. 1 is a schematic diagram of a token delivery apparatus constructed in accordance with one embodiment of the present invention.

FIG. 1 is a schematic elevation view of an apparatus 10 in accordance with an embodiment of the present invention. The apparatus comprises a housing 12, which may be generally rectangular in shape and have a transparent plastic cover. A supply of collection pieces or tokens 14 is stored in an upper portion of apparatus 10. Tokens 14 may be spherical in shape. For example, marbles may be employed as tokens. Cylindrical or disk shaped tokens could also be used.

Tokens 14 are stored on ramp 16. A release mechanism 18 releases the tokens one at a time when pressed. After being released, the token follows a delivery path to one or more collection reservoirs. The delivery path may include a variety of obstacles and/or interactive routing mechanisms such as are commonly found in pachinko or pinball machines so that the path followed by the released tokens varies from time to time. For example, the routing path may include pegs or pins to deflect the travel of the token, pivoting levers operated by the child, spring-loaded bumpers, etc. The routing path may also include lights and sound effects that are triggered by the passing token.

Returning to the illustrative example in FIG. 1, token 14 rolls down ramp 20 after being released and is dropped onto a plurality of projecting pins 22. The token travels downward through the array of pins under the influence of gravity and eventually lands on ramp 24. This ramp feeds the token into auger 26, which can be manually rotated by means of crank 28. Rotation of crank 28 lifts the token up to ramp 30 where it rolls downward onto a succession of ramps 32. The token finally drops onto ramp 34, which delivers the token to a routing mechanism 36. An aperture in routing mechanism 36 is positioned over one of token collection reservoirs 40a, 40b or 40c. The token is thus deposited into the selected one of the reservoirs. While the described embodiment of the invention has three such reservoirs, it will be understood that this is not a limitation of the invention and that a smaller or larger number of reservoirs may be employed. Indeed, apparatus 10 may have only a single reservoir, which would obviate the need for routing mechanism 36.

In the case of multiple token reservoirs, each of the reservoirs preferably includes indicia to associate the reservoir with a particular child in the household. Such indicia may comprise the child's name, a color, a graphic symbol or illustration. Each of the reservoirs also preferably includes indicia to indicate the number of tokens that have been collected.

Figure 2:
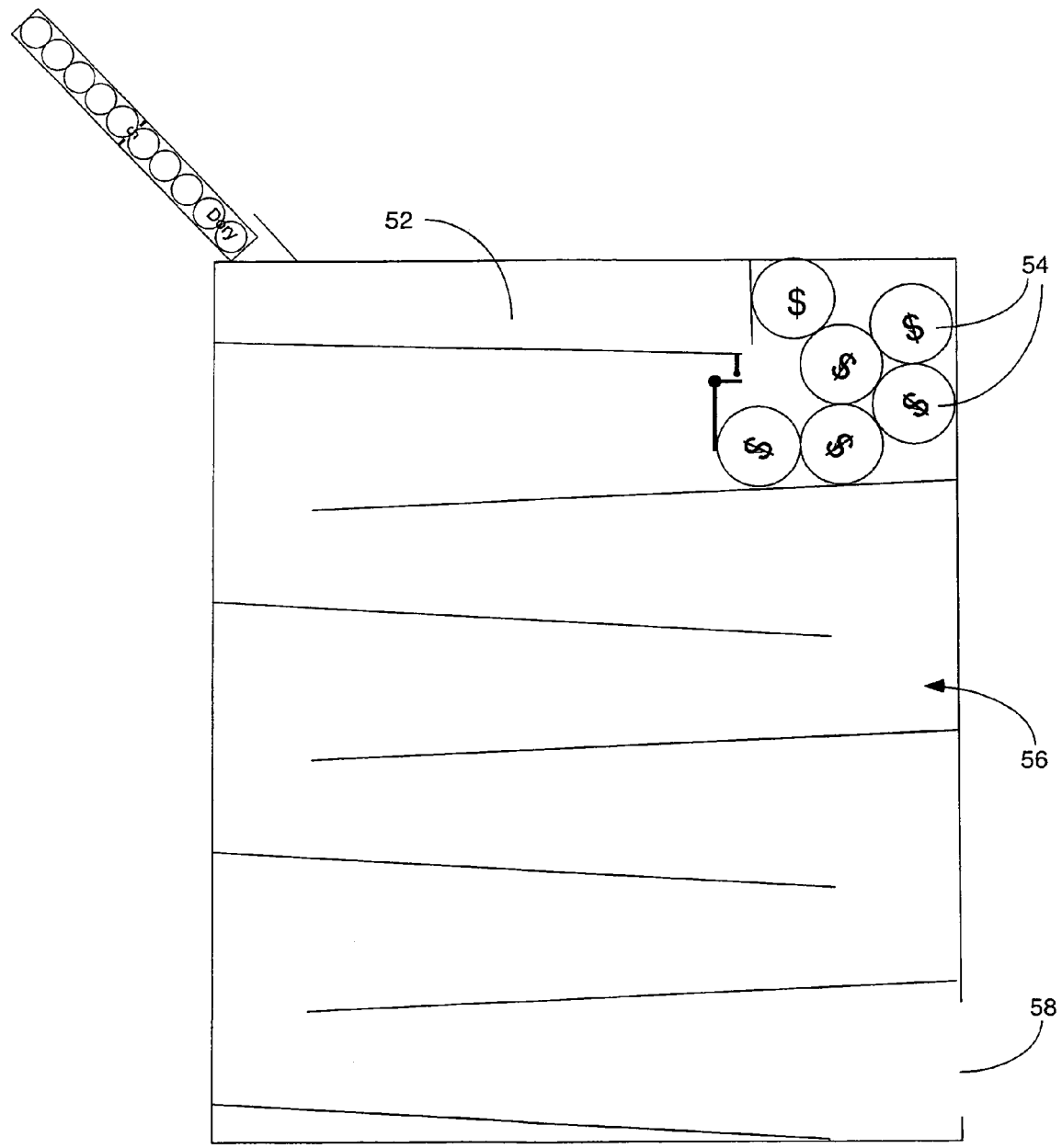
FIG. 2 is a schematic diagram of a reward delivery system that may be combined with the apparatus of FIG. 1.

Whenever a child exhibits good behavior deserving recognition, the parent or other caregiver may invite the child to release one of the tokens (with the appropriate setting of routing mechanism 36). Conversely, certain bad behavior may be penalized by removing one of more of the tokens that have been collected. Once a reservoir has been filled, the child may be rewarded with a prize. The reward may be given independent of the apparatus previously described, such as by presenting the child with a toy, book, monetary reward or other desired item or activity. However, the apparatus of the present invention may also incorporate a reward delivery system. FIG. 2 illustrates such a reward delivery system, which may be contained in a common housing with the token delivery system previously described or may be contained in a separate housing. In the latter case, the two housings may be coupled together with a hinge.

The tokens that have been collected in a reservoir are deposited into a receptacle 52. Deposit of the tokens causes one of a plurality of prizes 54 to be released. Each of the prizes 54 may comprise a hollow sphere containing either a physical prize or a note describing the prize to be received. The sphere may be either opaque or transparent. The release mechanism for prize 54 may be triggered by the weight of the tokens deposited in receptacle 52. Alternatively, other suitable means for sensing deposit of a required number of tokens may be employed.

When prize 54 is released, it travels along a prize delivery path 56 and is eventually deposited at opening 58 where it may be retrieved by the child. The prize delivery path 56 may include a variety of obstacles and interactive transport mechanisms as have been previously described in connection with the token delivery system. After the prize has been delivered, the tokens deposited in receptacle 52 may be returned to the supply for the token delivery system.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A motivational apparatus comprising:
    a supply of tokens;
    a release mechanism for releasing one of the tokens;
    a reservoir for collecting released tokens, wherein the reservoir includes indicia to indicate the number of tokens collected therein;
    a token delivery path between the supply of tokens and the reservoir; and
    an incentive to collect a predetermined number of tokens.

2. The apparatus of claim 1 wherein the tokens are generally spherical.

3. The apparatus of claim 1 wherein the token delivery path is variable.

4. The apparatus of claim 1 further comprising a plurality of obstacles in the token delivery path.

5. The apparatus of claim 1 wherein the incentive is a prize and further comprising a prize delivery mechanism.

6. The apparatus of claim 5 wherein the prize is contained in a hollow ball.

7. The apparatus of claim 6 further comprising a token receptacle and wherein the prize delivery mechanism releases the prize in response to the presence of the predetermined number of tokens in the token receptacle.

8. The apparatus of claim 1 wherein the reservoir is removable from the apparatus.

9. The apparatus of claim 1 wherein the reservoir is one of a plurality of reservoirs and further comprising a token routing mechanism between the supply of tokens and the plurality of reservoirs.

10. A reward delivery apparatus, comprising:
    a plurality of collection pieces;
    a release actuator for said collection pieces;
    a delivery path for said collection pieces;
    said delivery path leading to a reservoir for containing a predetermined number of said collection pieces;
    said reservoir including indicia to indicate the number of said collection pieces contained therein.

11. The apparatus of claim 10 wherein the delivery path is variable.

12. The apparatus of claim 10 further comprising a plurality of obstacles in the delivery path.

13. The apparatus of claim 10 wherein the reservoir is one of a plurality of reservoirs and wherein the delivery path can be adjusted to deliver the collection pieces to one of the plurality of reservoirs.

14. The apparatus of claim 10 wherein the delivery path is a first delivery path and further comprising a second delivery path that delivers a reward.

15. The apparatus of claim 14 wherein the presence of the predetermined number of said collection pieces in said reservoir releases said reward.

16. The apparatus of claim 14 wherein the reward is contained in a hollow ball.

* * * * *